United States Patent Office 3,155,674
Patented Nov. 3, 1964

3,155,674
2 - (HYDROXYIMINOMETHYL) 1 QUATERNARY PYRIDINIUM SALTS AND PROCESSES FOR THEIR PREPARATION
Wilbur Benedict McDowell, East Brunswick, N.J., assignor to Olin Mathieson Chemical Corporation, New York, N.Y., a corporation of Virginia
No Drawing. Filed Nov. 19, 1962, Ser. No. 238,765
9 Claims. (Cl. 260—296)

This invention relates to novel processes for the production of substituted pyridine derivatives. More particularly, this invention relates to novel processes for the production of pharmaceutically acceptable non-toxic salts of 2-(hydroxyiminomethyl)-1-methyl pyridinium. Included in the novel products which may be prepared by the processes of this invention are such compounds as the halide salts of 2-(hydroxyiminomethyl)-1-methyl pyridinium, such as 2-(hydroxyiminomethyl)-1-methyl pyridinium chloride, 2-(hydroxyiminomethyl)-1-methyl pyridinium bromide and 2 - (hydroxyiminomethyl) - 1- methyl pyridinium iodide; and the alkoxy salts of these compounds, such as 2-(hydroxyiminomethyl)-1-methyl pyridinium methoxide and 2-(hydroxyiminomethyl)-1-methyl pyridinium butoxide.

The final products of this invention are known to possess certain therapeutic properties and more specifically, these compounds are useful as specific antidotes against lethal alkylphosphate intoxication as described by I. Wilson et al. in U.S. Patent No. 2,816,113, granted December 10, 1957. However, heretofore, the methods of producing these compounds have proven to be commercially unattractive as they are both technically cumbersome and excessively expensive.

It has now been found that the 2 - (hydroxyiminomethyl)-1-methyl pyridinium salts of this invention may be prepared in a more economical manner by the novel processes of this invention which entail a number of steps beginning with α-picoline as a starting material.

In the first step of the most preferable embodiment of this invention, α-picoline is reacted with a methylating agent, such as methyl chloride, methyl bromide or methyl iodide, or dimethyl sulfate to yield the 1-methyl-2-picolinium halide or methyl sulfate salt. The 1-methyl-2-picolinium salt thus formed is then reacted with an excessive amount of strong alkali such as sodium hydroxide or potassium hydroxide, to form the corresponding anhydro base, 1-methyl-2-methylidene-1,2-dihydropyridine, which is then reacted with a corresponding nitroso halide, such as nitrosyl chloride or nitrosyl bromide, to yield the 2-(hydroxyiminomethyl)-1-methyl pyridinium halide, which is the final product of this invention. By an excessive amount of alkali it is meant that there must be employed at least an aqueous concentration of 20% or more of free alkali. Furthermore, quaternization of α-picoline with a methyl halide, such as methyl chloride, may be obtained more readily in the presence of a catalytic quantity of certain catalyzing material. The catalytic material preferred to be used in this process can be methanol combined with dimethylformamide. In this quaternization process the α-picoline is reacted with the methylating agent, such as methyl chloride, in the presence of methanol and dimethylformamide.

While in the most preferably embodiment of this invention the 1-methyl-2-picolinium salt is converted to the corresponding anhydro base as disclosed hereinbefore, this conversion is not essential to the preparation of 2-(hydroxyiminomethyl)-1-methyl pyridinium salts from 1-methyl-2-picolinium salts. Liberating the free base from the 1-methyl-2-picolinium salts by treatment with less than an excessive amount of strong alkali and reacting it with a nitrosating agent, such as nitrosyl halides, nitrous acid, and its derivatives or alkyl nitrites have also been found to be a synthetic route to the 2-(hydroxyiminomethyl) - 1 - methyl pyridinium salts. By less than an excessive amount of strong alkali it is meant that an aqueous concentration of alkali which provides less than 20% of free alkali may be employed and preferably it has been found that about one equivalent of the alkali yields the most satisfactory results. While it is preferred to employ about one equivalent of alkali in this procedure, the employment of less will give partially successful results. When more than one equivalent is used there will be a tendency to convert the free base to the anhydro base as disclosed above as the use of an excessive amount of alkali is approached.

In addition to the foregoing process, an alternative procedure for obtaining still further final products of this invention may be employed.

In this alternate process α-picoline is first reacted with a methylating agent and converted to the anhydro base as described above. The anhydro base is then treated with a nitrosating agent such as nitrous acid or its derivatives, alkyl nitrites (e.g., methyl nitrite, n-butyl nitrite) and the like to yield the 2-(hydroxyiminomethyl)-1-methyl pyridinium hydroxide, or alkoxide salts. In the case of the nitrous acid reaction a hydroxide anion salt is formed, while in the case of the alkyl nitrites an anonized alkoxide salt is obtained which is also a new final product of this invention. This salt may then be treated with an appropriate acidifying reagent, for example, a hydrogen halide, such as hydrogen chloride, hydrogen bromide or hydrogen iodide or another acid containing a pharmaceutically acceptable non-toxic anion to yield the desired 2-(hydroxyiminomethyl)-1-methyl pyridinium salt which is a final product of this invention.

The procedures of this invention may be further illustrated by the following examples without being restricted thereto.

EXAMPLE 1

1-Methyl-2-Picolinium Chloride

A mixture of 196 ml. of α-picoline, 10 ml. of dimethylformamide, 350 ml. of methanol and 170 ml. (at −68° C.) of methyl chloride are charged to a 1 liter autoclave and heated at 120–125° C. for one hour. After the mixture is cooled it is evaporated to dryness in vacuo. 296.8 gm. of residue is obtained, which residue is then dissolved in water, extracted with two 100 ml. portions of ether and the aqueous phase diluted to 402 ml. with water. An assay of the aqueous phase for ionic chloride indicates the presence of chloride equivalent to 700 mg./ml. of 1-methyl-2-picolinium chloride.

Similarly, following the procedure set forth in Example 1 but substituting methyl bromide or methyl iodide for the methyl chloride yields respectively 1-methyl-2-picolinium bromide or 1-methyl-2-picolinium iodide.

EXAMPLE 2

2-(Hydroxyiminomethyl)-1-Methyl Pyridinium Chloride 98 ml. of α-picoline is dissolved in dimethylformamide, cooled and 85 ml. (at −68° C.) of methyl chloride is added. The resulting solution is charged to an autoclave, sealed, mixed and the pressure built up to 500 p.s.i.g. with nitrogen. The mixture is heated at 125° C. to 130° C. for one hour, cooled and opened. The mixture is then filtered and the solids dried in vacuo yielding 82 g. of crude 1-methyl-2-picolinium chloride.

EXAMPLE 3

1-Methyl-2-Picolinium Chloride 98 ml. of α-picoline is dissolved in 200 ml. of methanol, cooled and 85 ml. (at −68° C.) of methyl chloride is added. The solution is charged to an autoclave, sealed and the nitrogen pressure of 300 p.s.i.g. is established. The mixture is heated at 120–130° C. for two hours, cooled and opened. The resulting solution is then evaporated to dryness in vacuo, yielding a residue of 110 g. This residue is then dissolved in 50 ml. of water and extracted with two 50 ml. portions of ether. The aqueous phase is then diluted to 150 ml. with water and an assay for ionic chloride is performed which indicates the presence of chloride ion equivalent to 721 mg./ml. of 1-methyl-2-picolinium chloride.

EXAMPLE 4

2-(Hydroxyiminomethyl)-1-Methyl Pyridinium Chloride

An aqueous solution of 15 ml. of 1-methyl-2-picolinium chloride having a concentration of 477 mg./ml. is covered with 50 ml. of benzene in an atmosphere of nitrogen and cooled to below 10° C. An aqueous solution of sodium hydroxide is added dropwise and the mixture is stirred for five minutes and allowed to stratify. The aqueous phase is then drawn off and the benzene solution is added slowly to a solution of 3 ml. of nitrosyl chloride in 175 ml. of benzene containing 0.5 ml. of dimethyl formamide at about 10° C. in an atmosphere of nitrogen with good agitation. The mixture is then stirred for 1.5 hours and then extracted with four 5 ml. of portions of water. The aqueous extracts are then concentrated in vacuo, 30 ml. of isopropanol is added and the concentration is repeated. Twenty ml. of isopropanol is then added to the concentrated mixture, and the mixture is cooled to room temperature and filtered, yielding 3.04 g. of crude 2-hydroxyiminomethyl)-1-methyl pyridinium chloride, melting at 202–214° C. with decomposition. The filtrate is then further concentrated to a 7 g. residue which is crystallized from absolute alcohol and yields 0.9 g. of 2-(hydroxyiminomethyl)-1-methyl pyridinium chloride melting at 221–225° C. with decomposition.

EXAMPLE 5

2-(Hydroxyiminoethyl)-1-Methyl Pyridinium Chloride

An aqueous solution of 9.8 ml. of 1-methyl-2-picolinium chloride and 1 ml. of water is covered with 75 ml. of toluene in an atmosphere of nitrogen and cooled to 5° C. An aqueous solution of sodium hydroxide prepared by dissolving 6 g. of sodium hydroxide in 7 ml. of water is added dropwise with good agitation. The mixture is stirred for five minutes and then allowed to stratify. The aqueous phase is drawn off and the resultant toluene solution is added to a solution consisting of 5 ml. of nitrosyl chloride in 50 ml. of toluene containing 0.5 ml. of dimethylformamide, cooled and held at about −10° C. for thirty minutes and at ambient temperature for about one hour. The mixture is then filtered and the solids dissolved in 15 ml. of methanol, boiled with 1 g. of activated charcoal, filtered, the charcoal washed with 15 ml. of hot methanol and the filtrates concentrated in vacuo until crystallization starts. The mixture is then cooled to 5° C. and filtered, yielding 2.79 g. of 2-(hydroxyiminomethyl)-1-methyl pyridinium chloride melting at about 228° C. with decomposition. Concentration of the mother liquor yields a second crop of 2-(hydroxyiminomethyl)-1-methyl pyridinium chloride melting at about 222–228° C. with decomposition.

EXAMPLE 6

1-Methyl-2-Picolinium Methylsulfate 24 ml. of dimethylsulfate is added dropwise to 25 ml. of α-picoline over a period of 1.5 hours with cooling to maintain the temperature at 50 to 60° C. The resulting solution is then heated at about 95–98° C. for two hours after which the mixture is cooled and dissolved in 40 ml. of water and extracted with two 40 ml. portions of ether. The aqueous solution is then concentrated in vacuo to yield 1-methyl-2-picolinium methylsulfate.

EXAMPLE 7

2-(Hydroxyiminomethyl)-1-Methyl Pyridinium Chloride

An aqueous solution of 1-methyl-2-picoline methylsulfate obtained in Example 6 is covered with 750 ml. of benzene in a nitrogen atmosphere and cooled to about 10° C. A solution of 60 g. of sodium hydroxide in 60 ml. of water is added slowly with good agitation, stirred for 10 minutes and the aqueous phase drawn off. The benzene solution is then added to a solution of 11 ml. of nitrosyl chloride and 500 ml. of benzene containing 10 ml. of dimethylformamide with good agitation, over a period of 0.5 hour and the resulting mixture is stirred for 1.5 hours at ambient temperature. The mixture is then filtered and the solids recrystallized from 200 ml. of methanol with an activated charcoal treatment, yielding 16.4 g. of 2-(hydroxyiminomethyl)-1-methyl pyridinium chloride melting at 223–225° C. with decomposition.

EXAMPLE 8

2-(Hydroxyiminomethyl)-1-Methyl Pyridinium Chloride

An aqueous solution of 10 ml. of 1-methyl-2-picolinium chloride is covered with 50 ml. of benzene in a nitrogen atmosphere, cooled to 5° C. and treated with a solution of 6 g. of sodium hydroxide and 6 ml. of water. The aqueous phase is separated and the benzene solution is slowly added with good agitation at about 10–15° C. in a nitrogen atmosphere to a solution of methyl nitrite (generated by adding 6 ml. of concentrated $H_2SO_4$ in 12 ml. of water to 9 g. of sodium nitrite in 6 ml. of water and 6 ml. of methanol) in 200 ml. of benzene containing 1 ml. of dimethylformamide and the mixture stirred for one hour at ambient temperature. The reaction mixture is then treated with a solution of 5 ml. of concentrated hydrochloric acid in 10 ml. of water, the aqueous phase separated and the organic phase extracted with two 10 ml. portions of water. The aqueous phases are combined, evaporated and the residue taken up in 60 ml. of absolute alcohol, boiled with activated charcoal, filtered and washed with 10 ml. of absolute alcohol, yielding a first crop of 1.5 g. of 2-(hydroxyiminomethyl)-1-methyl pyridinium chloride melting at 216–221° C. with decomposition and the second crop of 1.4 g. of 2-(hydroxyiminomethyl)-1-methyl pyridinium chloride melting with decomposition at 217–220° C.

EXAMPLE 9

2-(Hydroxyiminomethyl)-1-Methyl Pyridinium Butoxide

An aqueous phase of 10.8 ml. of 1-methyl-2-picolinium chloride, 1 ml. of water and 75 ml. of benzene are cooled to below 10° C. in a nitrogen atmosphere. A solution of 6 g. of sodium hydroxide in 7 ml. of water are added dropwise with good agitation and the mixture is stirred for two minutes, allowed to stratify and the aqueous phase is drawn off. The benzene solution is then added slowly to a solution of 5.2 g. of N-butylnitrite in 100 ml. of benzene at about 5 to 10° C. in a nitrogen atmosphere. A precipitate is formed and separated out yielding 2-hydroxyiminomethyl)-1-methyl pyridinium butoxide.

Similarly, substituting other alkyl nitrites for the N-butylnitrite of Example 9, the alkoxy derivative of 2-(hydroxyiminomethyl)-1-methyl pyridinium is obtained. For example, substituting methyl nitrite for the butyl nitrite of Example 9 yields 2-(hydroxyiminomethyl)-1-methyl pyridinium methoxide.

EXAMPLE 10

2-(Hydroxyiminomethyl)-1-Methyl Pyridinium Chloride

The 2-(hydroxyiminomethyl)-1-methyl pyridinium butoxide precipitate obtained in Example 9 is stirred for one hour at about 5 to 10° C. and allowed to warm slowly to room temperature over a subsequent period of three hours. A solution of 4 ml. of concentrated hydrochloric acid in 6 ml. of water is then added with thorough mixing and the resulting aqueous phase is separated while the organic phase is extracted with two 15 ml. portions of water. The aqueous extracts are then combined, evaporated and the residue crystallized from methanol yielding a first crop of 2.38 g. of 2-(hydroxyiminomethyl)-1-methyl pyridinium chloride melting at about 228–230° C. with decomposition, and a second crop of 0.72 g. of 2-(hydroxyiminomethyl) - 1 - methyl pyridinium chloride melting at about 218–220° C. with decomposition.

EXAMPLE 11

*2-(Hydroxyiminomethyl)-1-Methyl Pyridinium Chloride*

10.4 ml. of an aqueous solution of 1-methyl-2-picolinium chloride at 700 mg./ml. is covered with 75 ml. of benzene and cooled to below 10° C. in an atmosphere of nitrogen. A solution of 3 g. of sodium hydroxide in 6 ml. of water is added dropwise with thorough mixing at 5 to 10° C. The mixture is then allowed to stratify, the aqueous phase is drawn off and discarded. 2.5 ml. of nitrosyl chloride is vaporized into the benzene phase for a period of 25 minutes at about 5–10° C. The mixture is then stirred for an additional 30 minutes at ambient temperature and the product is separated by filtration. The wet solids are then recrystallized from methanol to yield 0.92 g. of 2-(hydroxyiminomethyl)-1-methyl pyridinium chloride having a melting point of about 230–232° C.

This invention may be variously otherwise embodied within the scope of the appended claims.

What is claimed is:

1. 2 - (hydroxyiminomethyl) - 1 - methyl pyridinium lower alkoxide.

2. The process for preparing 2-(hydroxyiminomethyl)-1-methyl pyridinium halide salts which comprises
    (a) reacting α-picoline with a methylating agent selected from the class consisting of methyl halides and dimethylsulfate;
    (b) completely hydrolyzing the resultant methylated salt by treatment with an excessive amount of a strong alkali to produce the corresponding anhydro base of the said methylated salt;
    (c) reacting the anhydro base with a nitrosyl halide; and
    (d) recovering the 2-(hydroxyiminomethyl)-1-methyl pyridinium halide formed.

3. The process for preparing 2-(hydroxyiminomethyl)-1-methyl pyridinium halide salts which comprises
    (a) reacting α-picoline with a methylating agent selected from the class consisting of methyl halides in the presence of a quaternization catalyst consisting of methanol and dimethyl formamide;
    (b) hydrolyzing the resultant methylated salt by treatment with less than an excessive amount of strong alkali to yield the free base of the said methylated salt;
    (c) reacting the free base with a nitrosyl halide; and
    (d) recovering the 2-(hydroxyiminomethyl)-1-methyl pyridinium halide formed.

4. The process for preparing 2-(hydroxyiminomethyl)-1-methyl pyridinium lower alkoxide which comprises
    (a) reacting α-picoline with a methylating agent selected from the class consisting of methyl halides and dimethyl sulfate;
    (b) completely hydrolyzing the resultant methylated salt by treatment with an excessive amount of a strong alkali to produce the anhydro base of the said methylated salt;
    (c) reacting the said anhydro base with alkyl nitrite; and
    (d) recovering the corresponding 2-(hydroxyiminomethyl)-1-methyl pyridinium lower alkoxide formed.

5. The process for preparing non-toxic pharmaceutically acceptable salts of 2 - (hydroxyiminomethyl) - 1 - methyl pyridinium which comprises reacting 2-(hydroxyiminomethyl)-1-methyl pyridinium lower alkoxide with an appropriate acidifying reagent containing a pharmaceutically acceptable non-toxic anion.

6. The process for preparing pharmaceutically acceptable non-toxic salts of 2-(hydroxyiminomethyl)-1-methyl pyridinium which comprises
    (a) reacting α-picoline with a methylating agent selected from the class consisting of methyl halides and dimethyl sulfate;
    (b) hydrolyzing the resultant methylated salt by treatment with less than an excessive amount with a strong alkali to yield the free base of the said methylated salt;
    (c) reacting the free base with an alkyl nitrite;
    (d) reacting the nitrosated anhydro base with an appropriate acidifying agent containing a pharmaceutically acceptable non-toxic anion; and
    (e) recovering the pharmaceutically acceptable non-toxic salts of 2 - (hydroxyiminomethyl) - 1 - methyl pyridinium.

7. The process for preparing pharmaceutically acceptable non-toxic salts of 2-(hydroxyiminomethyl)-1-methyl pyridinium which comprises
    (a) reacting α-picoline for a methylating agent selected from the class consisting of methyl halides and dimethyl sulfate;
    (b) incompletely hydrolyzing a resultant salt by treatment with less than an excessive amount of a strong alkali;
    (c) reacting the incompletely hydrolyzed methylated salt with a nitrosating agent selected from the class consisting of nitrosyl halides, nitrous acid and its derivatives and alkyl nitrites; and
    (d) reacting the resultant nitrosated salt with an appropriate acidifying agent containing a pharmaceutically acceptable non-toxic anion to yield the pharmaceutically acceptable non-toxic salts of 2-(hydroxyiminomethyl-1-methyl-pyridinium.

8. 2 - (hydroxyiminomethyl) - 1 - methyl pyridinium butoxide.

9. 2 - (hydroxyiminomethyl) - 1 - methyl pyridinium methoxide.

References Cited in the file of this patent

UNITED STATES PATENTS

| | | |
|---|---|---|
| 2,816,113 | Wilson et al. | Dec. 10, 1957 |
| 2,996,510 | Green | Aug. 15, 1961 |